(12) United States Patent
Uusitalo et al.

(10) Patent No.: US 8,228,838 B2
(45) Date of Patent: Jul. 24, 2012

(54) APPARATUS, SYSTEM AND METHOD FOR DETERMINING POSITION BY USE OF A LOW POWER WIRELESS LINK

(75) Inventors: Arttu Tapio Uusitalo, Ruutana (FI); Mauri Juhana Honkanen, Tampere (FI)

(73) Assignee: Nokia Corporation, Espoo (FI)

( * ) Notice: Subject to any disclaimer, the term of this patent is extended or adjusted under 35 U.S.C. 154(b) by 1098 days.

(21) Appl. No.: 12/080,795

(22) Filed: Apr. 3, 2008

(65) Prior Publication Data

US 2009/0253437 A1   Oct. 8, 2009

(51) Int. Cl.
*H04B 7/185* (2006.01)
*H04B 7/00* (2006.01)

(52) U.S. Cl. ........................ 370/318; 370/310
(58) Field of Classification Search .................... 370/318
See application file for complete search history.

(56) References Cited

U.S. PATENT DOCUMENTS

| | | | |
|---|---|---|---|
| 6,757,262 B1* | 6/2004 | Weisshaar et al. | 370/310 |
| 6,826,514 B1* | 11/2004 | Antico et al. | 702/188 |
| 7,519,371 B2* | 4/2009 | Nanda et al. | 455/452.2 |
| 2001/0015759 A1* | 8/2001 | Squibbs | 348/232 |
| 2004/0162084 A1* | 8/2004 | Wang | 455/456.1 |
| 2004/0248587 A1* | 12/2004 | Niemenmaa | 455/456.1 |
| 2006/0129691 A1* | 6/2006 | Coffee et al. | 709/230 |
| 2007/0115373 A1* | 5/2007 | Gallagher et al. | 348/231.3 |

FOREIGN PATENT DOCUMENTS

WO   WO 2009/019523   2/2009

\* cited by examiner

*Primary Examiner* — Kenny Lin
*Assistant Examiner* — Gerald Smarth
(74) *Attorney, Agent, or Firm* — Locke Lord LLP

(57) ABSTRACT

A system, comprising: a first low power wireless transceiver; a second low power wireless transceiver configured to transmit a first positioning request to the first low power wireless transceiver over a low power wireless link; a cellular radio transceiver configured, in response to the first low power wireless transceiver receiving the first positioning request, to transmit a second positioning request to a base station of a cellular network, and configured to receive, as a reply to the second positioning request, first positioning data from the base station of the cellular network; wherein the first low power wireless transceiver is configured to transmit second positioning data, determined by the first positioning data, to the second low power wireless transceiver over the low power wireless link as a reply to the first positioning request.

37 Claims, 6 Drawing Sheets

APPARATUS, SYSTEM AND METHOD FOR DETERMINING POSITION BY USE OF A LOW POWER WIRELESS LINK

FIELD OF THE INVENTION

Embodiments of the present invention relate to positioning. In particular, they relate to providing positioning information via a low power wireless link.

BACKGROUND TO THE INVENTION

In a satellite positioning system such as GPS (Global Positioning System), a satellite positioning receiver receives radio frequency signals from a number of satellites in order to calculate its position. In the case of GPS, radio frequency signals from four different satellites (out of a total of 24 different satellites) are received in order for a GPS receiver to resolve its position in three dimensions.

GPS satellites transmit radio frequency signals according to a Code Division Multiple Access (CDMA) protocol. All of the signals are transmitted in a single frequency band by using orthogonal chipping codes to spread the data across the frequency band. A different chipping code is assigned to each satellite communication channel, enabling a receiver to differentiate between different transmissions.

When a GPS receiver is used initially, or has not been used for a long time, it is said to be making a "cold start". In this situation, the GPS receiver does not know which of the 24 GPS satellites are visible from its position, what the chipping code or chipping code phase of the communication channels relating to the visible satellites are, or how Doppler shifting has affected the frequency of those communication channels.

Each of the 24 satellites transmits Almanac and Ephemeris data to provide at least some of this "missing information" to GPS receivers. The Almanac data gives the approximate position of all of the satellites in the system and the Ephemeris data enables the precise orbit of each satellite to be calculated. A GPS receiver is able to determine which satellites are in view using the Almanac and Ephemeris data.

However, in low signal conditions, such as if the GPS receiver is located indoors, it may not be possible to receive the Almanac and Ephemeris data, or the data may be received slowly. In this situation, the time to first fix (TTFF) can be as long as ten minutes. This is unacceptable to a user in many circumstances, and may mean that a user is discouraged from using GPS positioning.

BRIEF DESCRIPTION OF VARIOUS EMBODIMENTS OF THE INVENTION

According to various embodiments of the invention there is provided a system, comprising a first low power wireless transceiver housed in a first apparatus; a second low power wireless transceiver, housed in the second apparatus, configured to transmit a first positioning request to the first low power wireless transceiver over a low power wireless link; a cellular radio transceiver, housed in the first apparatus and configured, in response to the first low power wireless transceiver receiving the first positioning request, to transmit a second positioning request to a base station of a cellular network, and configured to receive, as a reply to the second positioning request, first positioning data from the base station of the cellular network; wherein the first low power wireless transceiver is configured to transmit second positioning data, determined by the first positioning data, to the second low power wireless transceiver over the low power wireless link as a reply to the first positioning request.

According to various embodiments of the invention there is provided a system, comprising: first low power wireless transceiver means housed in a first apparatus; second low power wireless transceiver means, housed in a second apparatus, for transmitting a first positioning request to the first low power transceiver means over a low power wireless link; cellular radio transceiver means, housed in the first apparatus and for transmitting, in response to the first low power wireless transceiver means receiving the first positioning request, a second positioning request to a base station of a cellular network, and for receiving, as a reply to the second positioning request, first positioning data from the base station of the cellular network; wherein the first low power wireless transceiver means is for transmitting second positioning data, determined by the first positioning data, to the second low power wireless transceiver means over the low power wireless link as a reply to the first positioning request.

According to various embodiments of the invention there is provided a method, comprising: transferring a first positioning request from a low power wireless transceiver to a further low power wireless transceiver over a low power wireless link; transmitting, in response to receiving the first positioning request at the further low power wireless transceiver, a second positioning request for first positioning data to a base station of a cellular network; receiving, as a reply to the second positioning request, first positioning data from the base station of the cellular network; and transferring second positioning data, determined by the first positioning data, from the further low power wireless transceiver to the low power wireless transceiver over the low power wireless link as a reply to the first positioning request.

According to various embodiments of the invention there is provided an apparatus, comprising: a first low power wireless transceiver configured to receive a first positioning request from a second low power wireless transceiver over a low power wireless link; a cellular radio transceiver configured, in response to the first low power wireless transceiver receiving the first positioning request, to transmit a second positioning request to a base station of a cellular network, and configured to receive, as a reply to the second positioning request, first positioning data from the base station of the cellular network; wherein the first low power wireless transceiver is configured to transmit second positioning data, determined by the first positioning data, to the second low power wireless transceiver over the low power radio link as a reply to the first positioning request.

According to various embodiments of the invention there is provided an apparatus, comprising: a first low power radio transceiver means for receiving a first positioning request from a second low power radio transceiver means over a low power radio link; cellular radio transceiver means for transmitting, in response to the first low power transceiver means receiving the first positioning request, a second positioning request to a base station of a cellular network, and for receiving, as a reply to the second positioning request, first positioning data from the base station of the cellular network; wherein the first low power wireless transceiver means is for transmitting second positioning data, determined by the first positioning data, to the second low power wireless transceiver means over the low power wireless link as a reply to the first positioning request.

According to various embodiments of the invention, there is provided a chipset, comprising: circuitry configured, in response to a first low power wireless transceiver receiving a first positioning request from a second low power wireless transceiver over a low power wireless link, to instruct a cellular radio transceiver to transmit a second positioning request to a base station of a cellular network; and circuitry configured to respond to the cellular radio transceiver receiving first positioning data from the base station by controlling the first low power wireless transceiver to transmit second positioning data to the second low power wireless transceiver over the low power wireless link, as a reply to the first positioning request; wherein the second positioning data is determined by the first positioning data.

According to various embodiments of the invention, there is provided a computer readable medium tangibly embodying computer program instructions, the computer program instructions comprising: instructions for controlling a cellular radio transceiver to transmit, in response to a first low power wireless transceiver receiving a first positioning request from a second low power transceiver over a low power wireless link, a second positioning request to a base station of a cellular network; and instructions for responding to the cellular radio transceiver receiving first positioning data from the base station by controlling the first low power wireless transceiver to transmit second positioning data to the second low power wireless transceiver over the low power wireless link, as a reply to the first positioning request, wherein the second positioning data is determined by the first positioning data.

According to various embodiments of the invention, there is provided a method, comprising: receiving a first positioning request over a low power wireless link; transmitting, in response to the reception of the first positioning request, a second positioning request to a base station of a cellular network; receiving, as a reply to the second positioning request, first positioning data from the base station of the cellular network; and transmitting second positioning data, determined by the first positioning data, over the low power wireless link as a reply to the first positioning request.

According to various embodiments of the invention, there is provided an apparatus, comprising: a low power wireless transceiver configured to transmit a positioning request to a further low power wireless transceiver over a low power wireless link, and configured to receive, as a reply to the positioning request, positioning data from the further low power wireless transceiver over the low power wireless link; and a satellite positioning receiver configured to use the received positioning data to receive positioning information from at least one satellite, in order to determine a position of the apparatus.

According to various embodiments of the invention, there is provided an apparatus, comprising: a low power wireless transceiver means for transmitting a positioning request to a further low power wireless transceiver means over a low power wireless link, and for receiving, as a reply to the positioning request, positioning data from the further low power wireless transceiver means over the low power wireless link; and satellite positioning receiver means for using the received positioning data to receive positioning information from at least one satellite, in order to determine a position of the apparatus.

According to various embodiments of the invention, there is provided a chipset, comprising circuitry configured to control a low power wireless transceiver to transmit a positioning request to a further low power wireless transceiver over a low power wireless link; and circuitry configured to respond to the low power wireless transceiver receiving positioning data from the further low power wireless transceiver over the low power wireless link by controlling a satellite positioning receiver to use the received positioning data to receive positioning information from at least one satellite, in order to determine the position of the chipset.

According to various embodiments of the invention, there is provided a computer readable medium tangibly embodying computer program instructions, the computer program instructions comprising: instructions for controlling a low power wireless transceiver to transmit a positioning request to a further low power wireless transceiver over a low power wireless frequency link; and instructions for responding to the low power wireless transceiver receiving positioning data from the further low power wireless transceiver over the low power wireless link by controlling a satellite positioning receiver to use the received positioning data to receive positioning information from at least one satellite, in order to determine a position of the satellite positioning receiver.

According to various embodiments of the invention, there is provided a method, comprising: transmitting a first positioning request over a low power wireless link; receiving, as a reply to the first positioning request, positioning data over the low power wireless link; and using the received positioning data to reduce the time taken to achieve satellite positioning.

BRIEF DESCRIPTION OF THE DRAWINGS

For a better understanding of various embodiments of the present invention reference will now be made by way of example only to the accompanying drawings in which.

DETAILED DESCRIPTION OF VARIOUS EMBODIMENTS OF THE INVENTION

Figure 6:
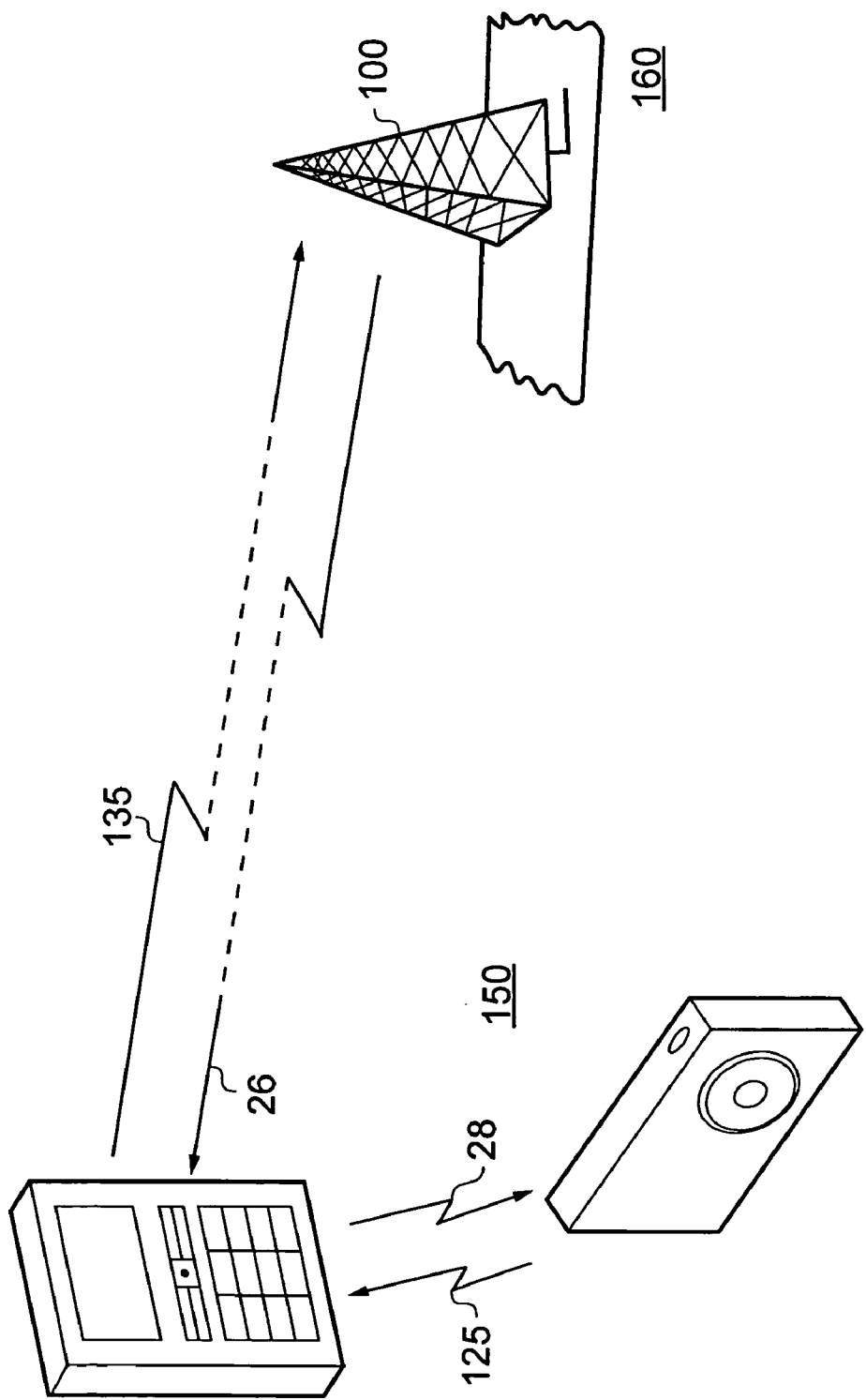
FIG. 6 is a graphical illustration of a method according to embodiments of the invention.

The Figures illustrate a system 150 (FIGS. 4, 6), comprising: a first low power wireless transceiver 22 housed in a first apparatus 10 (FIG. 1); a second low power wireless transceiver 52 housed in a second apparatus 40/70 (FIGS. 2, 3) configured to transmit a first positioning request 125 to the first low power wireless transceiver 22 over a low power wireless link 120/130; a cellular radio transceiver 20 housed in the first apparatus 10 and configured, in response to the first low power wireless transceiver 22 receiving the first positioning request 125, to transmit a second positioning request 135 to a base station 100 of a cellular network 160, and configured to receive, as a reply to the second positioning request 135, first positioning data 26 from the base station 100 of the cellular network 160 (FIG. 6); wherein the first low power wireless transceiver 22 is configured to transmit second positioning data 28, determined by the first positioning data 26, to the second low power wireless transceiver 52 over the low power wireless link 120/130 as a reply to the first positioning request 125.

Figure 1:
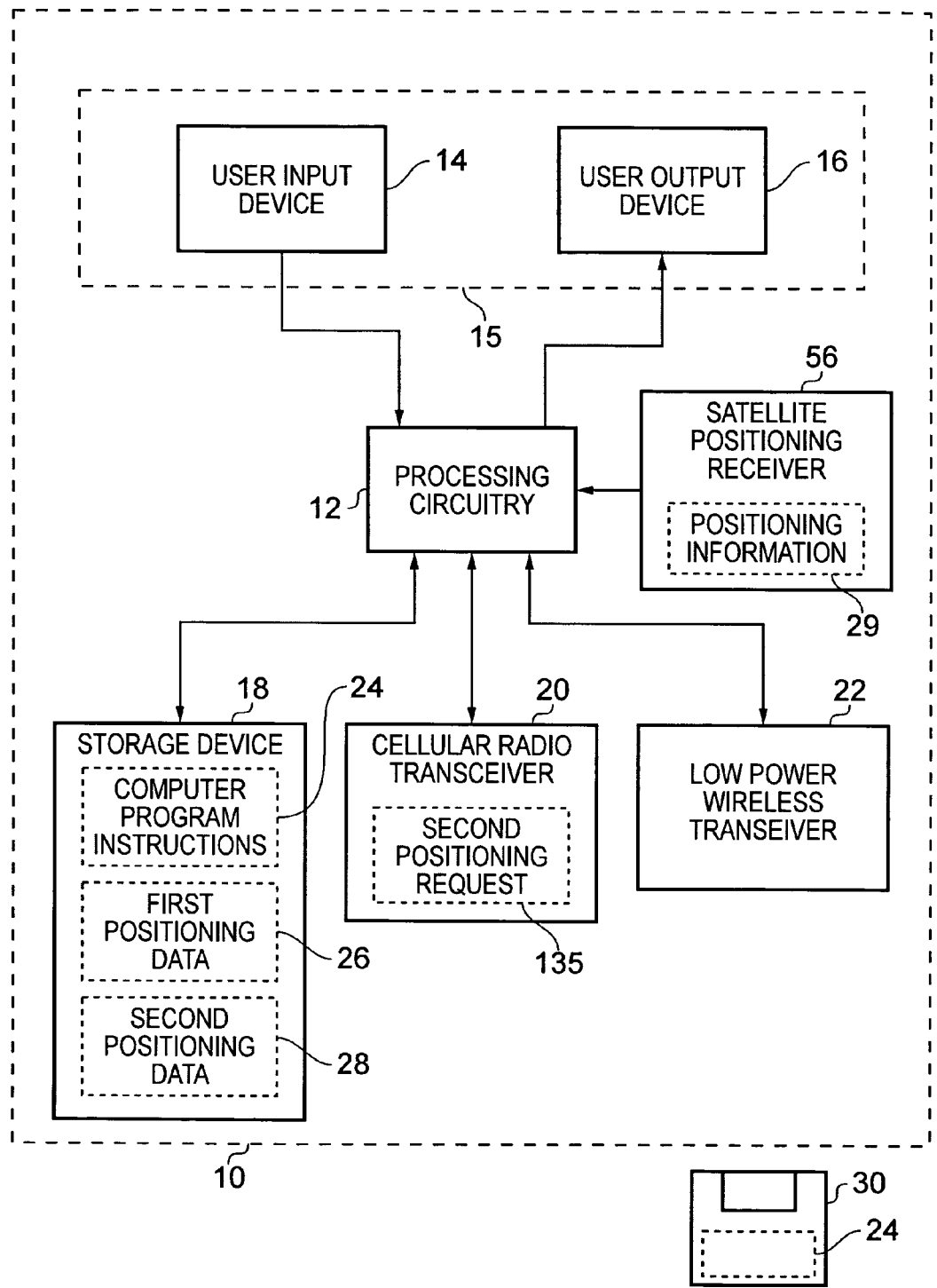
FIG. 1 illustrates a first apparatus, such as a mobile radio telephone.

FIG. 1 illustrates a schematic of an apparatus 10. The apparatus 10 may, for example, be a hand portable electronic apparatus such as a mobile radio telephone such as a mobile cellular telephone. The apparatus 10 comprises processing circuitry 12, a user input device 14, a user output device 16, a storage device 18, a cellular radio transceiver 20 and a low power wireless transceiver 22. The first apparatus 10 may optionally comprise a satellite positioning receiver 56.

The processing circuitry 12 may be any type of processing circuitry. For example, the processing circuitry 12 may be a programmable processor that interprets computer program instructions 24 and processes data. Alternatively, the processing circuitry 12 may be, for example, programmable hardware with embedded firmware. The processing circuitry 12 may be a single integrated circuit or a set of integrated circuits (i.e. a chip set). The processing circuitry 12 may also be a hardwired, application-specific integrated circuit (ASIC).

It will be appreciated by those skilled in the art that, for clarity, the processing circuitry 12 is described as being a separate entity to the cellular radio transceiver 20 and the low power wireless transceiver 22. However, it will be understood that the term "processing circuitry" may relate not only to a main processor of an apparatus, but also to processing circuitry included in a dedicated cellular radio transceiver chipset or a dedicated low power wireless transceiver chip set and even to a combination of processing circuitry included in a main processor, a cellular radio transceiver chipset and/or a low power wireless transceiver chipset.

A chipset comprising circuitry for performing embodiments of the invention may be incorporated within a module. Such a module may be integrated within the apparatus 10, and/or be separable from the apparatus 10.

The processing circuitry 12 is connected to receive an input from the user input device 14. The processing circuitry 12 is also connected to provide an output to the user output device 16. The user output device 16 is for conveying information to the user and may be, for example, a display device. The user input device 14 and the user output device 16 together form a user interface 15. The user interface 15 may be provided as a single unit, such as a touch screen display device.

The processing circuitry 12 is connected to write to and read from the storage device 18. The storage device 18 may be a single memory unit or a plurality of memory units.

The storage device is illustrated in FIG. 1 as storing computer program instructions 24, first positioning data 26 and second positioning data 28. The computer program instructions 24, the first positioning data 26 and second positioning data 28 may be stored permanently or transiently by the storage device 18. In some embodiments of the invention later described, the first positioning data 26 may be the same as the second positioning data 28. In these embodiments, it is not necessary to store the same data twice.

The computer program instructions 24 may control the operation of the apparatus 10 when loaded into the processing circuitry 12. The computer program instructions 24 may provide the logic and routines that enable the first apparatus 10 to perform at least part of the method illustrated in FIG. 5.

The computer program instructions 24 may arrive at the apparatus 10 via an electromagnetic carrier signal or be copied from a physical entity 30 such as a CD-ROM, a DVD, or a Blu-ray disc. The computer program instructions 24 provide: instructions for controlling a cellular radio transceiver 20 to transmit, in response to a first low power wireless transceiver 22 receiving a first positioning request 125 from a second low power transceiver 52 over a low power wireless link 120/130, a second positioning request 135 to a base station 100 of a cellular network 160; and instructions for responding to the cellular radio transceiver 20 receiving first positioning data 26 from the base station 100 by controlling the first low power wireless transceiver 22 to transmit second positioning data 28 to the second low power wireless transceiver 52 over the low power wireless link 120/130, as a reply to the first positioning request 125, wherein the second positioning data 28 is determined by the first positioning data 26.

The processing circuitry 12 is connected to receive input from and output to the cellular radio transceiver 20. The cellular radio transceiver 20 is configured to receive and transmit radio frequency signals in a cellular network. For example, the cellular network may operate according to one or more of the GSM, UMTS, IS-95 or CDMA 2000 protocols. The cellular radio transceiver 20 may be considered to transmit and receive signals of a "high power", for example signals having a transmission range of up to around 3 to 5 miles.

The processing circuitry 12 is connected to receive an input from and provide an output to the low power wireless transceiver 22. The low power wireless transceiver 22 is configured to transmit and receive wireless signals. The wireless signals may, for example, have a transmission range of 100 meters or less. In some embodiments of the invention, the wireless signals may, for instance, have a transmission range of 10 meters or less. For example, the low power wireless transceiver 22 may be a low power radio transceiver configured to operate in accordance with a 802.11 wireless local area network (WLAN) protocol, a Bluetooth protocol or an ultra low power Bluetooth protocol. The low power wireless transceiver 22 may also be configured to operate in accordance with protocols relating to UWB or Zigbee technologies. Alternatively, the low power wireless transceiver 22 may be configured to operate using infra-red or near-field communication signals.

The processing circuitry 12 may be configured to provide an output to and to receive an input from the satellite positioning receiver 56. The term "satellite positioning receiver" is considered to relate to any type of satellite positioning system, including the Global Positioning System (GPS), the Russian/Indian system GLONASS and the proposed European positioning system Galileo. The satellite positioning receiver 56 is configured to receive positioning information 29 from a plurality of satellites and to determine a position of the apparatus 10 using the received positioning information 29.

Figure 2:
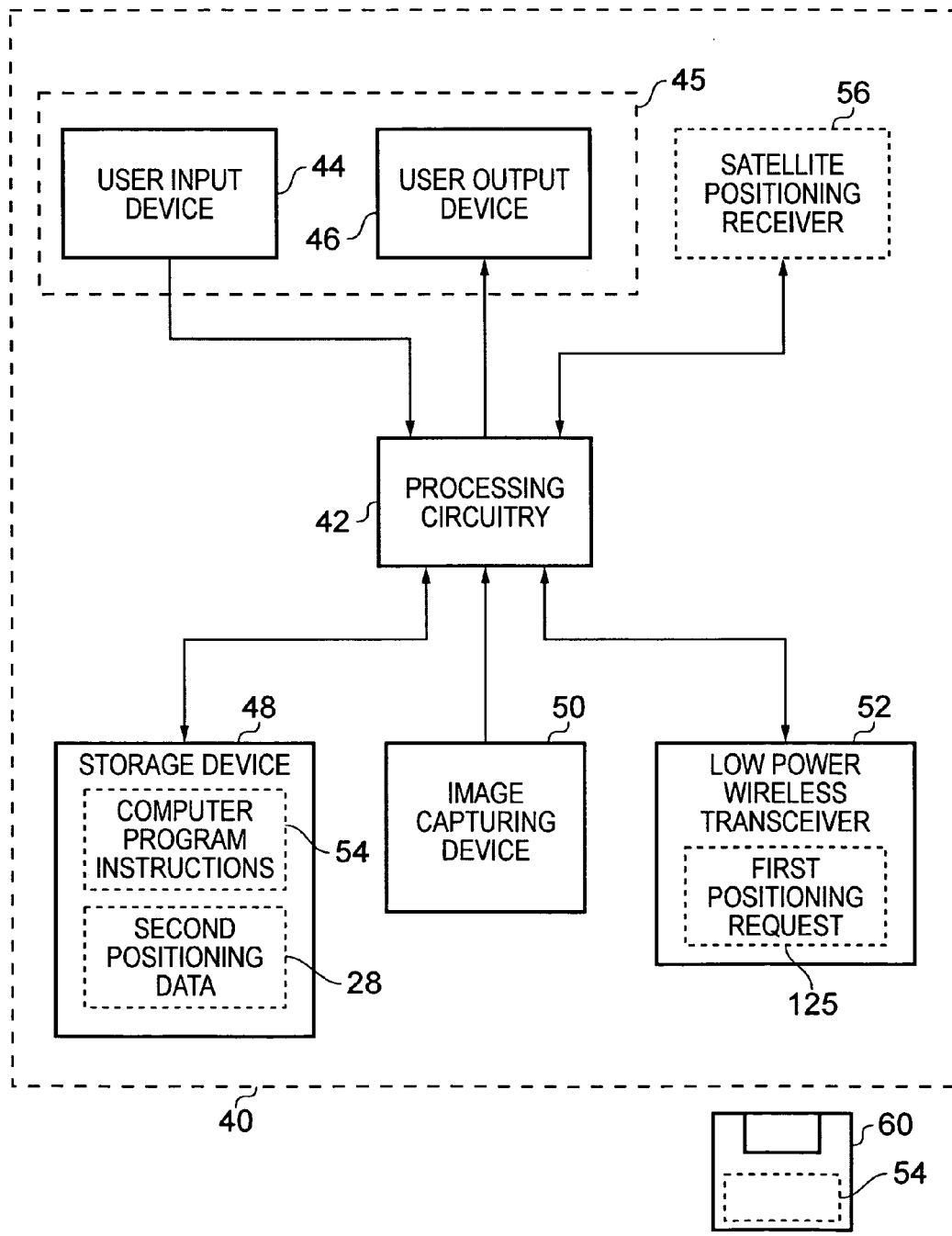
FIG. 2 illustrates a second apparatus, such as an imaging apparatus.

FIG. 2 illustrates a second apparatus 40. The second apparatus 40 may, for example, be an imaging apparatus such as a standalone, hand portable, camera or a different type of apparatus. The second apparatus 40 comprises processing circuitry 42, a user input device 44, a user output device 46, a storage device 48, and a low power wireless transceiver 52. The second apparatus 40 may optionally comprise a satellite positioning receiver 56.

The processing circuitry 42 may be any type of processing circuitry, including the types of processing circuitry that were mentioned in relation to the processing circuitry 12 of the first apparatus 10. It will be appreciated by those skilled in the art that, for clarity, the processing circuitry 42 is described as being a separate entity to the low power wireless transceiver 52 and the satellite positioning receiver 56. However, it will be understood that the term "processing circuitry" in this context may relate not only to a main processor of an apparatus, but also processing circuitry included in a chipset relating to the low power wireless transceiver 52 and/or the satellite positioning receiver 56, or even a combination of processing circuitry included in the main processor, a chipset associated with the low power wireless transceiver 52 and/or the satellite positioning receiver 56.

The processing circuitry 42 is connected to receive an input from the user input device 44 and to provide an output to the user output device 46. The user output device 46 is for conveying information to the user and may be, for example a display device. The user input device 44 and the user output device 46 together form a user interface 45. The user interface 45 may be provided as a single unit, such as a touch screen display device.

The processing circuitry 42 is connected to write to and to read from the storage device 48. The storage device 48 may be a single memory unit or a plurality of memory units. The storage device 48 may store computer program instructions 54 that control the operation of the apparatus 40 when loaded into the processing circuitry 42. The computer program instructions 54 may provide the logic and routines that enable the second apparatus 20 to perform at least part of the method illustrated in FIG. 5.

The computer program instructions 54 may arrive at the second apparatus 40 via an electromagnetic carrier signal or be copied from a physical entity 60 such as a computer program product, a storage device or physical medium such as a CD-ROM, a DVD or Blu-ray disc.

The computer program instructions 54 provide: instructions for controlling a low power wireless transceiver 52 to transmit a positioning request 125 to a further low power wireless transceiver 22 over a low power wireless frequency link 120/130; and instructions for responding to the low power wireless transceiver 52 receiving positioning data 28 from the further low power wireless transceiver 22 over the low power wireless link 120/130 by controlling a satellite positioning receiver to use the received positioning data 28 to receive positioning information 29 from at least one satellite, in order to determine a position of the satellite positioning receiver 56.

The processing circuitry 42 is connected to receive an input from the image capturing device 50. The image capturing device 50 may comprise, for example, a digital sensor chip such as a CCD or a CMOS device, one or more lenses, a flash unit and dedicated image processing circuitry. Still images or video taken using the image capturing device 50 may be stored in the storage device 48.

The processing circuitry 42 may be configured to provide an output to and to receive an input from the satellite positioning receiver 56. The satellite positioning receiver 56 may operate in a similar fashion to the satellite positioning receiver described in relation to the first apparatus 10.

The processing circuitry 42 is connected to receive an input from and to provide an output to the low power wireless transceiver 52. The low power wireless transceiver is configured to receive wireless signals. The wireless signals may, for instance, have a transmission range of 100 meters or less. In some embodiments of the invention, the wireless frequency signals may, for instance, have a transmission range of 10 meters or less. The low power wireless transceiver 52 of the second apparatus 40 is configured to operate in accordance with the same or a similar protocol to the low power wireless transceiver 22 of the first apparatus 10, such that the transceivers 22 and 52 can communicate with one another.

Figure 3:
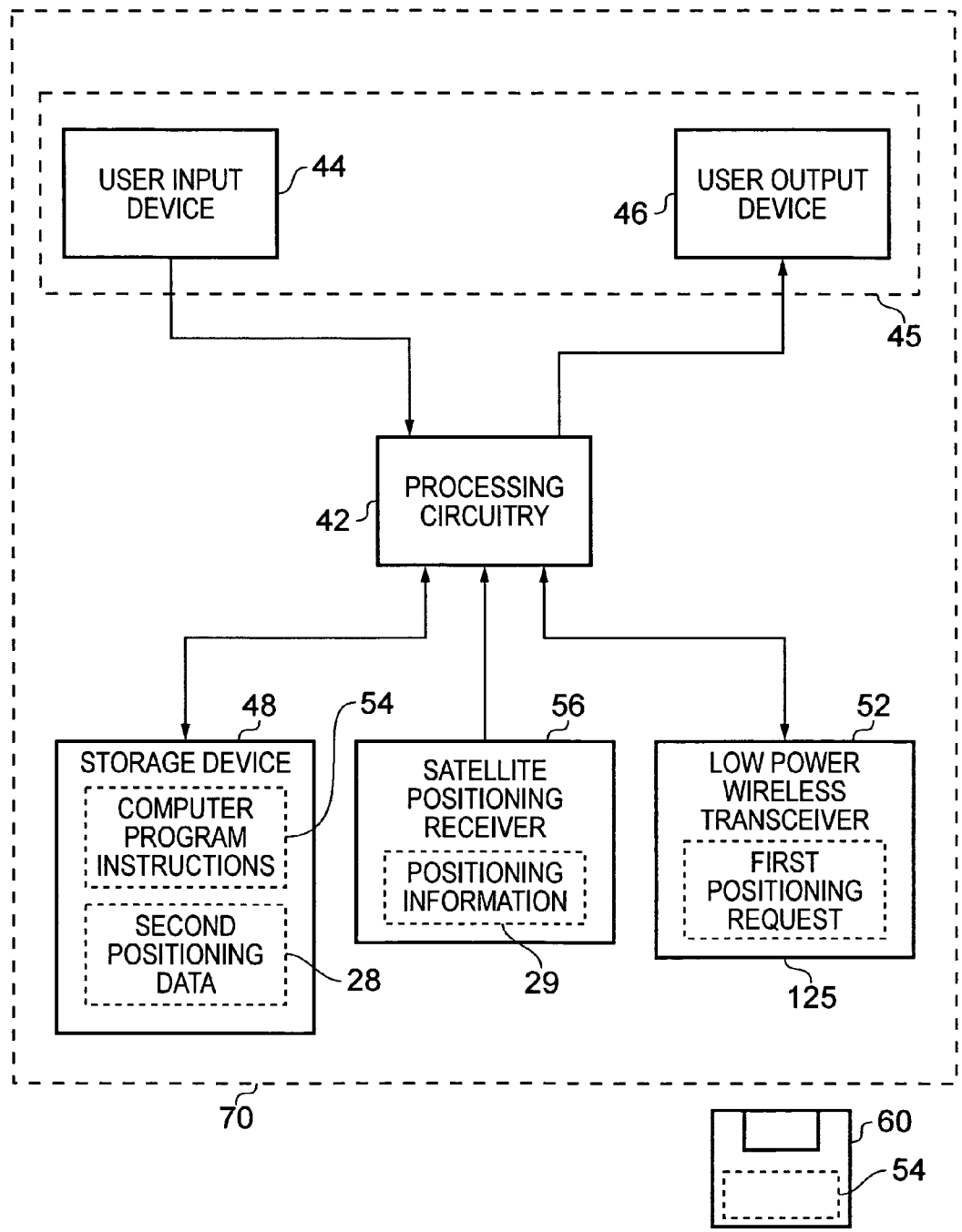
FIG. 3 illustrates a third apparatus, such as a satellite navigation apparatus.

FIG. 3 illustrates a third apparatus 70. The third apparatus 70 may, for example, be a standalone, hand portable, satellite navigation apparatus or a different type of apparatus. The third apparatus 70 comprises processing circuitry 42, a user input device 44, a user output device 46, a storage device 48, a low power wireless transceiver 52 and a satellite positioning receiver 56. The components of the third apparatus 70 are connected in a similar fashion to those in the second apparatus 40 and may operate in a similar fashion. In view of this, the components of the third apparatus 70 have been given the same reference numerals as the equivalent components in the second apparatus 40, and will not be described further for conciseness.

Figure 4:
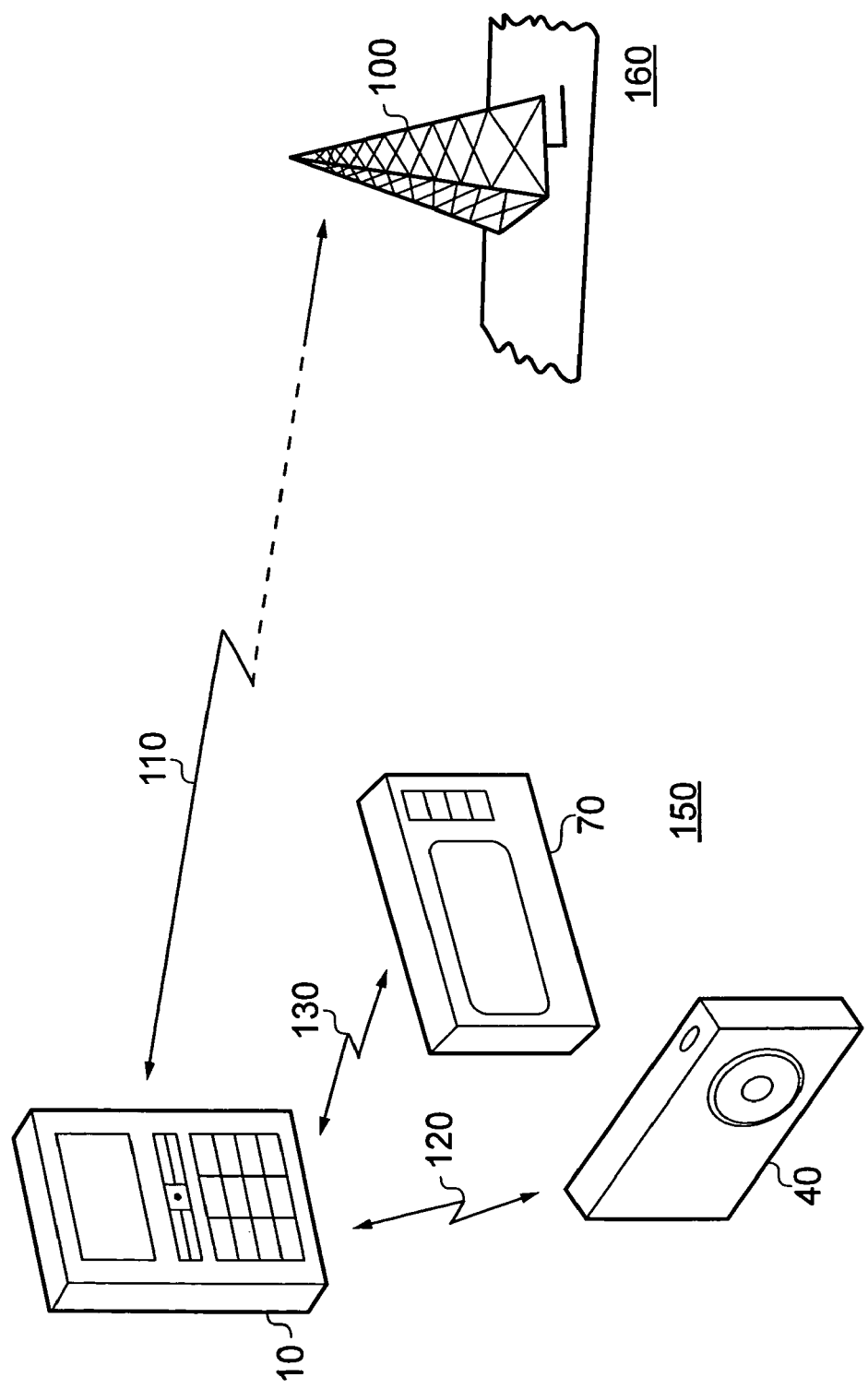
FIG. 4 illustrates a mobile radio telephone communicating with an imaging apparatus and a satellite navigation apparatus over low power wireless links, and communicating with a base station of a cellular network.

FIG. 4 illustrates a first apparatus 10 that may communicate with a second apparatus 40 via a first low power wireless link 120, and with a third apparatus 70 via a second low power wireless link 130. The first apparatus 10 may also communicate with a cellular base station 100 of a cellular network 160 via a cellular communication channel 110.

Figure 5:
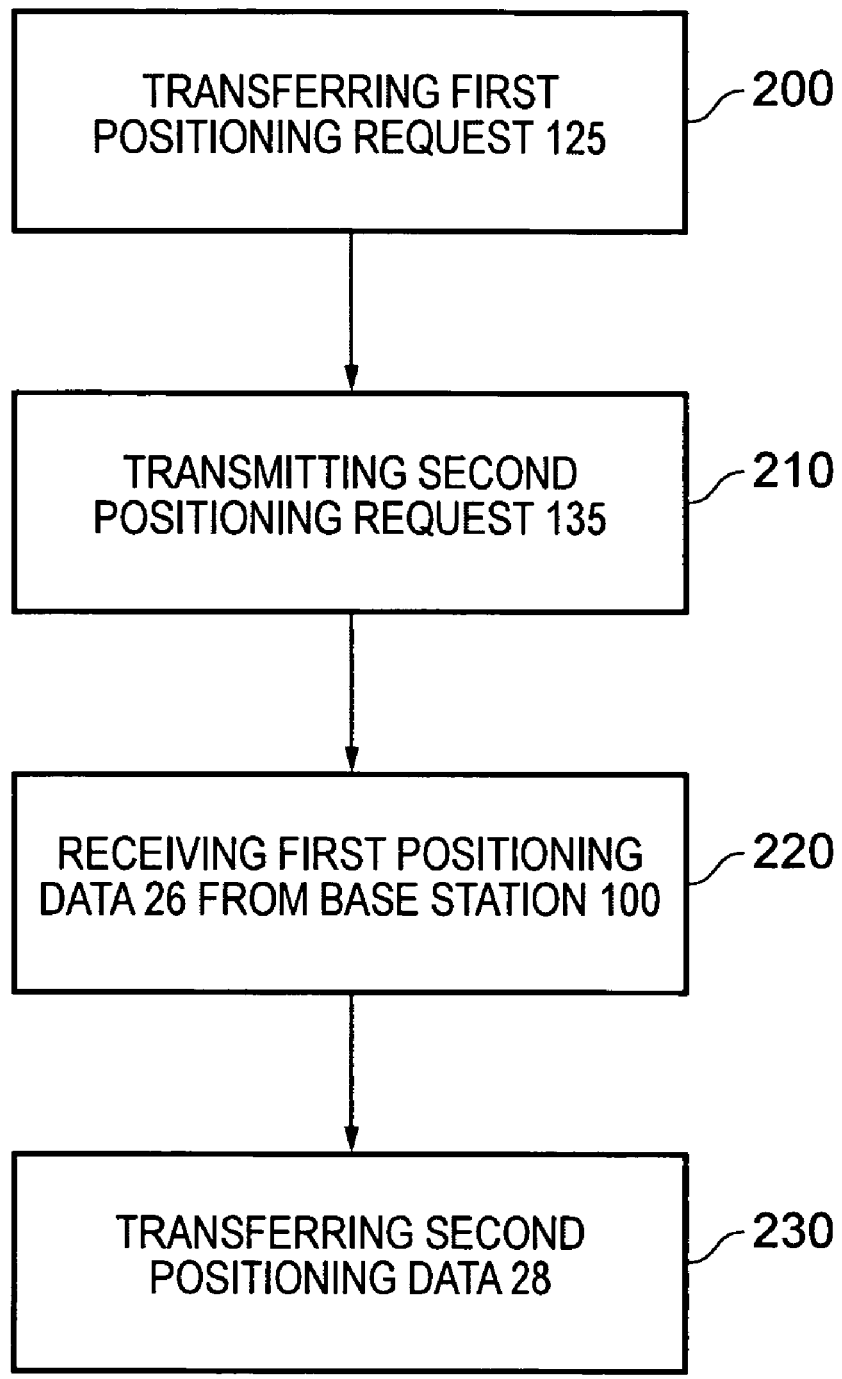
FIG. 5 is a flow diagram of a method according to embodiments of the invention.

FIG. 5 illustrates an outline method in blocks 200 to 230. The method of FIG. 5 is illustrated graphically in FIG. 6. Various embodiments of the invention will now be described in relation to both FIG. 5 and FIG. 6.

I) Saving Positioning Metadata to an Image or Video at an Imaging Apparatus without Using Satellite Positioning at the Imaging Apparatus or a Mobile Radio Telephone In some circumstances, it may be desirable for a user of the imaging apparatus 40 to associate positioning metadata with image data or video data captured using the imaging apparatus 40. This may involve adding the positioning metadata to an image file or a video file. The positioning metadata may identify the position at which the image or video was captured. However, in this particular example, the imaging apparatus 40 does not comprise a satellite positioning receiver 56 for determining its own position.

Before or after capturing the image or video with which positioning metadata is to be associated, the user may set up a low power wireless link 120 between the imaging apparatus 40 and his mobile radio telephone 10. For example, where the low power wireless transceivers 22 and 52 operate according to the Bluetooth protocol, the user may carry out a pairing procedure.

It may not be necessary for a user to set up a low power wireless link 120 between the imaging apparatus 40 and his mobile radio telephone 10 each time he wishes to associate positioning metadata with image data or video data. For example, once a low power wireless link 120 has been set up, it may stay active, for example, in a low power maintenance mode. Also, in some embodiments of the invention, after the low power wireless link 120 has been set up by a user for the first time, it may be re-established automatically (i.e. without user intervention) once the low power wireless transceivers 22, 52 come into range of one another.

The low power wireless link 120 may be "ad-hoc" in the sense that it may be established by the user as and when the user desires to use the link 120.

At block 200 of FIG. 5, the user indicates, via the user input device 44 of the imaging apparatus 40, that he wishes to associate positioning metadata with a selected image or video stored in the storage device 48. The processing circuitry 42 responds to an input from the user input device 44 to control the low power wireless transceiver 52 to transmit a first positioning request 125 to the mobile radio telephone 10 via the low power wireless link 120. The first positioning request 125 comprises data that indicates that the imaging apparatus 40 wishes to receive information identifying its current position.

In some embodiments of the invention, a user may indicate, via the user input device 44 of the imaging apparatus 40, that he wishes to associate positioning metadata with captured images or videos automatically. In these embodiments, in response to the capture of an image or a video, the processing circuitry 42 may control the low power wireless transceiver 52 to transmit a first positioning request 125 to the mobile radio telephone 10.

When the low power wireless transceiver 22 of the mobile radio telephone 10 has received the first positioning request 125, the processing circuitry 12 of the mobile radio telephone 10 controls the cellular radio transceiver 20 to transmit a second positioning request 135 to a base station 100 of a cellular network 160 at block 210.

The base station 100 receives the second positioning request 135 from the mobile radio telephone 10 over the cellular radio channel 110 and transmits first positioning data 26 to the mobile radio telephone 10 as a reply to the second positioning request 135. The first positioning data 26 indicates the position of the mobile telephone 10. The position may be indicated qualitatively by the first positioning data (e.g. "California, USA") or quantitatively (e.g. by providing latitudinal and longitudinal co-ordinates).

The position indicated in the first positioning data 26 may have been determined using a satellite positioning receiver at the base station 100. The position of the base station 100 is considered to be roughly the same as that of the mobile radio telephone 10 and the imaging apparatus 40, because the mobile telephone 10 must be within the cell of the base station 100 in order to have transmitted the first positioning request 125 to it. Alternatively, the cellular network 160 may determine the position of the mobile radio telephone 10 using another technique, such as triangulation or trilateration.

At block 220 of FIG. 5, the cellular radio transceiver 20 of the mobile radio telephone 10 receives the first positioning data 26 from the base station 100 over the cellular radio channel 110. In response to the reception of the first positioning data 26, the processing circuitry 12 of the mobile radio telephone 10 controls the low power transceiver 22 to transmit second positioning data 28 to the imaging apparatus 40 over the low power wireless link 120 as a reply to the first positioning request 125. In this particular embodiment, the second positioning data 28 is the same as the first positioning data 26 in that it comprises the same positioning information. The mobile radio telephone 10 therefore acts to forward the first positioning data 26 to the imaging apparatus 40.

In response to receiving the second positioning data 28 at the low power transceiver 52 of the imaging apparatus, the processing circuitry 42 of the imaging apparatus 40 stores the second positioning data 28 in the storage device 48 and associates it with the stored image or video that was originally selected by the user. The storage of the associated second positioning data 28 enables the user to determine, at some later point in time, where the stored image or video was captured.

Therefore, advantageously, embodiments of the invention enable an imaging apparatus to associate and store positioning metadata with an image or video, without requiring the imaging apparatus to have a satellite positioning receiver.

In alternative embodiments of the invention to those described above, a user may select the granularity of the position that the user wishes to associate with the stored image or video. The selection may be made using the user input device 14 of the mobile radio telephone 10 or the user input device 44 of the imaging apparatus 40. For example, if the user is on vacation, he may want the associated positioning metadata to indicate a position that is no more specific than the country (e.g. Spain) or the city (e.g. London, England) in which the image or video was captured. In other circumstances, the user may wish to associate a more precise position with the stored image or video (for example, if he wishes to return to the position that the image or video was captured at some later point in time). In this situation, the user may wish to associate longitudinal and latitudinal co-ordinates with the stored image or video.

If the user indicates the granularity of the position by using the user interface of the imaging apparatus 40, the first positioning request 125 may include data that indicates the granularity of the position required to the mobile radio telephone 10.

Once the processing circuitry 12 of the mobile radio telephone 10 has been informed of the granularity of position required by the imaging apparatus 40 (either via the first positioning request 125 or via the user input device 14 of the mobile radio telephone 10) the processing circuitry 12 may control the cellular radio transceiver 20 to transmit a second positioning request 135 that indicates the granularity of the position that the mobile radio telephone 10 wishes to receive from the base station 100 of the cellular network 160. For example, the level of granularity may be "state and country". The first positioning data 26 that the base station 160 transmits to the mobile radio telephone 10 in response to receiving the second positioning request 135 would explicitly indicate a state and country (e.g. Arkansas, USA).

Alternatively, the second positioning request 135 may not specify the granularity of the data that it wishes to receive from the base station 160. In this example, the processing circuitry 12 of the mobile radio telephone 10 may generalize the position received in the first positioning data 26 from the base station 160 and then transmit the generalized position to the imaging apparatus 40 via the low power wireless link 120. The generalized position may be a position area encompassing the position defined in the first positioning data 26. It will be appreciated that in this instance, the second positioning data 28 (i.e. that which is transmitted to the imaging apparatus 40 by the mobile radio telephone 10) is different to the first positioning data 26 (i.e. that which is received by the mobile radio telephone 10 by the base station 100).

For example, the first positioning data 26 received from the base station 100 may include longitudinal and latitudinal co-ordinates. The processing circuitry 12 of the mobile radio telephone 10 may compare the received co-ordinates with co-ordinates in a look-up table stored locally or remotely to determine which state and country the co-ordinates correspond to. The state and country may then be transmitted to the imaging apparatus 40 in the second positioning data 28. The longitudinal and latitudinal co-ordinates received in the first positioning data 26 need not, however, be transmitted to the imaging apparatus 40 in the second positioning data 28.

II) Saving Positioning Metadata to an Image or Video at a Imaging Apparatus using a Satellite Positioning Receiver at an Imaging Apparatus In this particular example of the invention, the imaging apparatus 40 comprises a satellite positioning receiver 56 for determining its own position. However, for reasons such as those explained in the "Background to the Invention" section, there may be circumstances in which the time that the satellite positioning receiver 56 takes to find a position is large.

For example, it may be that the satellite positioning receiver 56 has not determined a position for a long period of time. In this case, the satellite positioning receiver 56 may not be aware of which satellites are visible from its current position.

At block 200 of FIG. 5, the user indicates, via the user input device 44 of the imaging apparatus 40, that he wishes to associate positioning metadata with an image or video stored in the storage device 48. The processing circuitry 42 of the imaging apparatus 40 responds to an input from the user input device 44 to control the low power wireless transceiver 52 to transmit a first positioning request 125 to the mobile radio telephone 10 via the low power wireless link 120. The first positioning request 125 comprises data that indicates that the satellite positioning receiver 56 wishes to receive assistance in identifying its current position. The first positioning request 125 may or may not specify the types of data that the satellite positioning receiver 56 wishes to receive from the mobile radio telephone 10.

For example, the first positioning request 125 may specify that the satellite positioning receiver 56 wishes to receive assistance information (e.g. assisted-GPS information), such as one of more of: information relating to the orbit of at least one satellite (i.e. to determine which satellites are visible to it), information indicating the chipping code or chipping code phase of at least one the communication channel relating to one more visible satellites, and information regarding how Doppler shifting has affected the frequency of those communication channels, or other information that may accelerate positioning.

When the low power wireless transceiver 22 of the mobile radio telephone 10 has received the first positioning request 125, the processing circuitry 12 of the mobile radio telephone 10 controls the cellular radio transceiver 20 to transmit a second positioning request 135 to a base station 100 of a cellular network 160 at block 210. If the first positioning request 125 that was received from the imaging apparatus 40 specified the types of data the imaging apparatus 40 wishes to receive, the second positioning request 135 may also specify the same types of data.

The base station 100 receives the second positioning request 135 from the mobile radio telephone 10 over the cellular radio channel 110 and transmits first positioning data 26 to the mobile radio telephone 10 as a reply to the second positioning request 135. The first positioning data 26 comprises data for assisting the satellite positioning receiver 56 of the imaging apparatus 40 in identifying its current position.

For example, the first positioning data 26 may include assistance information (e.g. assisted-GPS information) such as information relating to the orbit of at least one satellite (i.e. to determine which satellites are visible to it), information indicating the chipping code or chipping code phase of at least one the communication channel relating to one more visible satellites, and information regarding how Doppler shifting has affected the frequency of those communication channels, or other information that may accelerate positioning.

At block 220 of FIG. 5, the cellular radio transceiver 20 of the mobile radio telephone 10 receives the first positioning data 26 from the base station 100 over the cellular radio channel 110. In response to the reception of the first positioning data 26, the processing circuitry 12 of the mobile radio telephone 10 controls the low power transceiver 22 to transmit second positioning data 28 to the imaging apparatus 40 over the low power wireless link 120 as a reply to the first positioning request 125.

The second positioning data 28 may be the same as the first positioning data 26 in that they both comprise the same assistance information. In this instance, the mobile radio telephone 10 acts to forward the first positioning data 26 to the imaging apparatus 40.

Alternatively, the second positioning data 28 may not be the same as the first positioning data 26. For example, if the mobile radio telephone 10 is able to perform trilateration or triangulation to determine its approximate position, the second positioning data 28 may include the approximate position determined by the mobile radio telephone 10 and the assistance information included in the first positioning data 26.

After receiving the second positioning data 28 at the low power transceiver 52 of the imaging apparatus, the satellite positioning receiver 56 uses the second positioning data 28 to receive positioning information 29 from at least one satellite, in order to determine its position.

Typically, the time that elapses between the imaging apparatus 40 issuing the first positioning request 125 and the satellite positioning receiver 56 determining its position using the assistance information received in the second positioning data 28 is less than that time that the satellite positioning receiver 56 would otherwise take to determine its position without the assistance information. For example, the time to first fix (TTFF) may be reduced. Embodiments of the invention may therefore advantageously reduce the time taken by the satellite positioning receiver 56 to determine its position, using assistance information from the cellular network 160, even though the imaging apparatus 40 is not itself able to operate in the cellular network 160.

It may be that the processing circuitry 42 or satellite positioning receiver 56 of the imaging apparatus 40 is able to identify circumstances in which the time that the satellite positioning receiver 56 takes to find its position is likely to be particularly long (e.g. if the satellite positioning receiver 56 has not been used for a certain period of time). The processing circuitry 42 may be configured to control the low power radio transceiver 52 of the imaging apparatus 40 to transmit the first positioning request 125 in these circumstances; otherwise the satellite positioning receiver 56 may determine the position of the imaging apparatus 40 without any assistance from the mobile radio telephone 10.

III) Saving Positioning Metadata to an Image or Video at a Imaging Apparatus using a Satellite Positioning Receiver at a Mobile Radio Telephone In this example of the invention, the imaging apparatus 40 transmits a first positioning request 125 to the mobile radio telephone 10 as described above in example 1. Upon reception of the first positioning request 125, the processing circuitry 12 determines whether the mobile radio telephone 10 comprises a satellite positioning receiver 56. The satellite positioning receiver 56 of the mobile radio telephone 10 may be located within the housing of the mobile radio telephone 10, or may be external to the housing of the mobile radio telephone 10 and connected to the mobile radio telephone 10 via a low power wireless link.

If the mobile radio telephone 10 does not comprise a satellite positioning receiver 56, it obtains a position from the cellular network 160 in accordance with example 1.

If the mobile radio telephone 10 comprises a satellite positioning receiver 56, the mobile radio telephone 10 determines whether the circumstances are such that the time that the satellite positioning receiver 56 will take to find a position is large (as described in example 11 above in relation to the satellite positioning receiver 56 of the imaging apparatus 40).

In the event that the circumstances are such that the time taken to find a position will not be large, the satellite positioning receiver 56 determines the position of the mobile radio telephone 10 and forwards it to the imaging apparatus 40. The granularity of the position provided to the imaging apparatus 40 by the mobile radio telephone 10 may depend upon selections made by the user at the imaging apparatus 40 and/or at the mobile radio telephone 10.

In the event that the circumstances are such that the time taken to find a position will be large, the processing circuitry 12 of the mobile radio telephone 10 controls the cellular radio transceiver 20 to transmit a second positioning request 135 to the base station 100 of the cellular network 160. In response to receiving the second positioning request 135, the base station 100 transmits first positioning data 26 to the mobile radio telephone 10. The first positioning data 26 includes assistance information (e.g. such as assisted-GPS information) of the same form as that described in example 11 above.

After the assistance information has been received at the mobile radio telephone 10, it is used by the satellite positioning receiver 56 to determine the position of the mobile radio telephone 10. The mobile radio telephone 10 then transmits second positioning data 28 to the imaging apparatus 40 as a reply to the first positioning request 135. The second positioning data 28 includes a position. The granularity of the position transmitted to the imaging apparatus 40 may depend upon selections made by the user at the imaging apparatus 40 and/or at the mobile radio telephone 10.

IV) Determining a Position at a Standalone Satellite Navigation Apparatus

The embodiments of the invention described in example 11 above relating to quickly determining a position using a satellite positioning receiver 56 at a imaging apparatus 40 can also be applied to determining a position at a satellite navigation apparatus 70. The satellite navigation apparatus 70 could, for example, be permanently or temporarily situated in an automobile.

The satellite navigation apparatus 70 may be configured to navigate the user from a position determined using assistance information received over the low power wireless link 130 from the mobile radio telephone 10, to another position.

Although embodiments of the present invention have been described in the preceding paragraphs with reference to various examples, it should be appreciated that modifications to the examples given can be made without departing from the scope of the invention as claimed. For example, the first apparatus 10 has been described as being a mobile radio telephone 10. However, the first apparatus 10 could be any apparatus that is able to access a cellular network.

Features described in the preceding description may be used in combinations other than the combinations explicitly described.

Whilst endeavoring in the foregoing specification to draw attention to those features of the invention believed to be of particular importance it should be understood that the Applicant claims protection in respect of any patentable feature or combination of features hereinbefore referred to and/or shown in the drawings whether or not particular emphasis has been placed thereon.

What is claimed is:

1. A system, comprising:
    a first low power wireless transceiver housed in a first apparatus;
    a satellite positioning receiver housed in a second apparatus;
    a second low power wireless transceiver, housed in the second apparatus, configured to transmit a first positioning request to the first low power wireless transceiver over a low power wireless link; and
    a cellular radio transceiver, housed in the first apparatus and configured, in response to the first low power wireless transceiver receiving the first positioning request, to transmit a second positioning request to a base station of a cellular network, and configured to receive, as a reply to the second positioning request, first positioning data from the base station of the cellular network;
    wherein the first low power wireless transceiver is configured to transmit second positioning data, determined at least partially from the first positioning data, to the second low power wireless transceiver over the low power wireless link as a reply to the first positioning request; and
    wherein the satellite positioning receiver, housed in the second apparatus, is configured to use the second positioning data to determine a position.

2. The system as claimed in claim 1, wherein the first positioning data is the same as the second positioning data.

3. The system as claimed in claim 1, wherein the second positioning data identifies an approximate position determined using the cellular network.

4. The system as claimed in claim 1, wherein second positioning data is different from the first positioning data.

5. The system as claimed in claim 1, wherein the second positioning data comprises data relating to the orbit of at least one satellite.

6. The system as claimed in claim 1, wherein the second positioning data comprises data relating to the phase of a code transmitted by at least one satellite.

7. The system as claimed in claim 1, wherein the second positioning data comprises data relating to frequencies to be searched by the satellite positioning receiver housed in the second apparatus.

8. The system as claimed in claim 1, wherein the cellular radio transceiver enables the first apparatus to operate as a mobile radio telephone in the cellular network.

9. The system as claimed in claim 1, wherein the second apparatus is an imaging apparatus comprising a memory for storing images and/or video and processing circuitry configured to associate a position identified in the second positioning data with a stored image or a stored video.

10. The system as claimed in claim 1, wherein the second apparatus is a navigation apparatus configured to navigate from one position to another position.

11. The system as claimed in claim 1, wherein the first positioning request is a request for information to assist the satellite positioning receiver, housed in the second apparatus, to determine a position.

12. The system as claimed in claim 1, wherein the second positioning data indicates the approximate position of the first apparatus.

13. A method, comprising:
    transferring a first positioning request to a first low power wireless transceiver housed in a first apparatus from a second low power wireless transceiver housed in a second apparatus over a low power wireless link;
    transmitting, via a cellular radio transceiver housed in the first apparatus, in response to receiving the first positioning request at the first low power wireless transceiver, a second positioning request to a base station of a cellular network;
    receiving, via the cellular radio transceiver, as a reply to the second positioning request, first positioning data from the base station of the cellular network; transferring transmitting second positioning data, determined at least partially from the first positioning data, from the first low power wireless transceiver to the second low power wireless transceiver over the low power wireless link as a reply to the first positioning request; and
    using a satellite positioning receiver housed in the second apparatus to determine a position using the second positioning data.

14. The method as claimed in claim 13, wherein the first positioning data is the same as the second positioning data.

15. The method as claimed in claim 13, wherein the first positioning data is different to the second positioning data.

16. An apparatus, comprising:
    processing circuitry; and
    at least one memory storing computer program instructions that, when performed by the processing circuitry, cause at least the following to be performed:
    responding to reception, over a low power wireless link, of a first positioning request from a further apparatus by controlling transmission of a second positioning request to a base station of a cellular network;

responding to reception of first positioning data, received from the base station of the cellular network as a reply to the second positioning request, by controlling transmission of second positioning data, determined at least partially from the first positioning data, to the further apparatus over the low power wireless link as a reply to the first positioning request, wherein the second positioning data is for use in determining a position using a satellite positioning receiver housed in the further apparatus.

17. The apparatus as claimed in claim 16, wherein the first positioning data is the same as the second positioning data.

18. The apparatus as claimed in claim 16, wherein the second positioning data is different from the first positioning data.

19. The apparatus as claimed in claim 18, wherein the first positioning data identifies an approximate position determined using the cellular network.

20. A system comprising the apparatus as claimed in claim 16 and the further apparatus housing the satellite positioning receiver, wherein the further apparatus housing the satellite positioning receiver is configured to determine its position using the second positioning data.

21. The apparatus as claimed in claim 16, wherein the second positioning data indicates the approximate position of the apparatus.

22. A method, comprising:

responding to reception, over a low power wireless link, of a first positioning request from an apparatus by controlling transmission of a second positioning request to a base station of a cellular network; and responding to reception of first positioning data, received from the base station of the cellular network as a reply to the second positioning request, by controlling transmission of second positioning data, determined at least partially from the first positioning data, to the apparatus over the low power wireless link as a reply to the first positioning request, wherein the second positioning data is for use in determining a position using a satellite positioning receiver housed in the apparatus.

23. The method as claimed in claim 22, wherein the first positioning data is the same as the second positioning data.

24. The method as claimed in claim 22, wherein the first positioning data is different from the second positioning data.

25. A non-transitory computer-readable medium storing computer program instructions that, when performed by processing circuitry, cause at least the method as claimed in claim 22 to be performed.

26. The method as claimed in claim 22, wherein the second positioning data indicates the approximate position of the apparatus.

27. A second apparatus, comprising:

processing circuitry; and at least one memory storing computer program instructions that, when performed by the processing circuitry, cause at least the following to be performed:

controlling transmission of a first positioning request to a first apparatus over a low power wireless link; and a satellite positioning receiver housed in the second apparatus configured to use the second positioning data, received from the first apparatus over the low power wireless link as a reply to the first positioning request, to determine a position of the second apparatus, wherein said second positioning data received from the first apparatus is determined at least partially from first positioning data that is received by the first apparatus as a result of a cellular radio transceiver housed in the first apparatus transmitting a second positioning request to a base station in response to the first positioning request and receiving, as a reply to the second positioning request, said first positioning data from the base station.

28. The apparatus as claimed in claim 27, wherein the apparatus is an imaging apparatus comprising a memory for storing images and/or video and processing circuitry configured to associate the position determined by the satellite positioning receiver with a stored image or a stored video.

29. The apparatus as claimed in claim 27, wherein the apparatus is a navigation apparatus configured to navigate from one position to another position.

30. The apparatus as claimed in claim 27, wherein the positioning data indicates the approximate position of the apparatus.

31. The apparatus as claimed in claim 27, wherein use of the received positioning data reduces the time taken by the satellite positioning receiver to determine a position.

32. A method, comprising:

controlling transmission of a first positioning request, to a first apparatus from a second apparatus, over a low power wireless link; and using second positioning data, received from the first apparatus over the low power wireless link as a reply to the first positioning request, to determine a position of the second apparatus, wherein said second positioning data received from the first apparatus is determined at least partially from first positioning data that is received by the first apparatus as a result of a cellular radio transceiver housed in the first apparatus transmitting a second positioning request to a base station in response to the first positioning request and receiving, as a reply to the second positioning request, said first positioning data from the base station.

33. The method as claimed in claim 32, further comprising associating the determined position with an image.

34. The method as claimed in claim 32, further comprising providing information for navigating from the determined position to another position.

35. A non-transitory computer-readable medium storing computer program instructions that, when performed by processing circuitry, cause at least the method as claimed in claim 32 to be performed.

36. The method as claimed in claim 32, wherein the positioning data indicates the approximate position of the apparatus.

37. The method as claimed in claim 32, wherein use of the received positioning data reduces the time taken by the satellite positioning receiver to determine a position.

* * * * *